United States Patent
Kwon et al.

(10) Patent No.: US 9,161,224 B2
(45) Date of Patent: Oct. 13, 2015

(54) APPARATUS AND METHOD FOR MANAGING APPLICATION IN WIRELESS TERMINAL

(71) Applicant: Samsung Electronics Co., Ltd., Gyeonggi-do (KR)

(72) Inventors: Se-Hong Kwon, Busan (KR); Don-Gyo Jun, Gyeongsangbuk-do (KR); Soon-Shik Hwang, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/707,866

(22) Filed: May 8, 2015

(65) Prior Publication Data

US 2015/0245210 A1 Aug. 27, 2015

Related U.S. Application Data

(63) Continuation of application No. 14/498,109, filed on Sep. 26, 2014, which is a continuation of application No. 13/404,806, filed on Feb. 24, 2012, now Pat. No. 8,886,165.

(30) Foreign Application Priority Data

Aug. 30, 2011 (KR) .................. 10-2011-0087304

(51) Int. Cl.
*H04M 1/66* (2006.01)
*H04W 12/06* (2009.01)
*H04M 1/725* (2006.01)

(52) U.S. Cl.
CPC .......... *H04W 12/06* (2013.01); *H04M 1/72522* (2013.01)

(58) Field of Classification Search
CPC ......... G06F 21/36; G06F 21/45; G06F 21/46; G06F 21/74; G06F 2221/2105; G06F 2221/2113; G06F 2221/2217; G06F 2221/2147
See application file for complete search history.

(56) References Cited

U.S. PATENT DOCUMENTS

| | | | |
|---|---|---|---|
| 7,593,000 B1 | 9/2009 | Chin | |
| 8,588,739 B2* | 11/2013 | Kawabata | 455/410 |
| 2003/0163811 A1 | 8/2003 | Luehrs | |
| 2004/0236508 A1 | 11/2004 | Ogasawara | |
| 2005/0097563 A1 | 5/2005 | Bidet et al. | |
| 2007/0011461 A1 | 1/2007 | Jeng | |
| 2007/0150842 A1* | 6/2007 | Chaudhri et al. | 715/863 |
| 2008/0263643 A1 | 10/2008 | Jaiswal et al. | |
| 2010/0138914 A1* | 6/2010 | Davis et al. | 726/19 |

(Continued)

FOREIGN PATENT DOCUMENTS

| | | |
|---|---|---|
| CN | 101980131 A | 2/2011 |
| EP | 1 816 580 A1 | 8/2007 |

(Continued)

*Primary Examiner* — Kashif Siddiqui
(74) *Attorney, Agent, or Firm* — Cha & Reiter, LLC

(57) ABSTRACT

Provided is an apparatus and method for managing an application in a wireless terminal, in which data of an application is managed and displayed according to an input type of a password for unlocking the wireless terminal, wherein the apparatus includes a memory for storing a plurality of passwords and a controller for classifying and managing data of each of a plurality of applications according to a password type.

30 Claims, 4 Drawing Sheets

(56) References Cited

U.S. PATENT DOCUMENTS

| | | |
|---|---|---|
| 2010/0199100 A1 | 8/2010 | Goertzen |
| 2010/0306718 A1 | 12/2010 | Shim et al. |
| 2011/0080349 A1 | 4/2011 | Holbein et al. |
| 2011/0080350 A1 | 4/2011 | Almalki et al. |
| 2011/0088086 A1* | 4/2011 | Swink et al. .............. 726/7 |
| 2011/0256848 A1* | 10/2011 | Bok et al. ............. 455/411 |
| 2011/0294467 A1* | 12/2011 | Kim et al. ............. 455/411 |
| 2011/0316797 A1 | 12/2011 | Johansson |
| 2012/0023573 A1 | 1/2012 | Shi |
| 2012/0046077 A1* | 2/2012 | Kim et al. ............. 455/566 |
| 2012/0054057 A1 | 3/2012 | O'Connell et al. |
| 2012/0066650 A1 | 3/2012 | Tirpak et al. |
| 2012/0081282 A1 | 4/2012 | Chin |
| 2012/0084734 A1 | 4/2012 | Wilairat |
| 2012/0151400 A1 | 6/2012 | Hong et al. |
| 2012/0291121 A1 | 11/2012 | Huang et al. |
| 2012/0311499 A1 | 12/2012 | Dellinger et al. |
| 2013/0014250 A1 | 1/2013 | Brown et al. |
| 2013/0052993 A1 | 2/2013 | Kwon et al. |
| 2013/0093707 A1 | 4/2013 | Park et al. |
| 2013/0318598 A1 | 11/2013 | Meacham |
| 2013/0333020 A1 | 12/2013 | Deshpande |
| 2014/0040943 A1 | 2/2014 | Knowles et al. |
| 2014/0075552 A1 | 3/2014 | Guriappa Srinivas et al. |
| 2014/0143844 A1 | 5/2014 | Goertzen |
| 2014/0259152 A1 | 9/2014 | Yun |

FOREIGN PATENT DOCUMENTS

| | | |
|---|---|---|
| KR | 10-0496954 B1 | 6/2005 |
| KR | 10-2007-0002346 A | 1/2007 |
| KR | 10-2009-0073864 A | 7/2009 |
| KR | 10-2010-0134884 A | 12/2010 |
| KR | 10-2011-0042634 A | 4/2011 |
| KR | 10-2012-0006696 A | 1/2012 |
| KR | 10-2014-0070307 A | 6/2014 |
| WO | 2004/046925 A1 | 6/2004 |
| WO | 2010/040670 A2 | 4/2010 |

* cited by examiner

APPARATUS AND METHOD FOR MANAGING APPLICATION IN WIRELESS TERMINAL

CLAIM OF PRIORITY

The present application is a Continuation of U.S. patent application Ser. No. 14/498,109 filed on Sep. 26, 2014 which claims the benefit of the earlier U.S. patent application Ser. No. 13/404,806 filed on Feb. 24, 2012 and assigned U.S. Pat. No. 8,886,165 issued on Nov. 11, 2014 which claims the benefit of the earlier filing date, under 35 U.S.C. §119 of a Korean Patent Application filed in the Korean Intellectual Property Office on Aug. 30, 2011 and assigned Serial No. 10-2011-0087304, the entire disclosure of which is hereby incorporated by reference.

BACKGROUND

1. Field of the Invention

The present invention relates to an apparatus and method for managing an application in a wireless terminal.

2. Description of the Related Art

To protect private information, a password is generally used in a wireless terminal. The password used in the wireless terminal, however, merely unlocks the wireless terminal.

Moreover, the wireless terminal can store only one password and does not provide a function of distinguishing a user or managing data using the password.

SUMMARY

Accordingly, an aspect of the present invention is to provide an apparatus and method for managing an application of a wireless terminal, in which data of an application is managed according to a type of a password for unlocking the wireless terminal.

According to an aspect of the present invention, an apparatus for managing an application in a wireless terminal includes a memory for storing a plurality of passwords, and a controller for classifying and managing data of each of a plurality of applications according to a type of a password.

According to another aspect of the present invention, a method for managing an application in a wireless terminal includes inputting a particular password for unlocking the wireless terminal, and if the input particular password is included in a plurality of preset passwords, classifying and managing each of a plurality of applications according to a type of the input particular password.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

Figure 1:
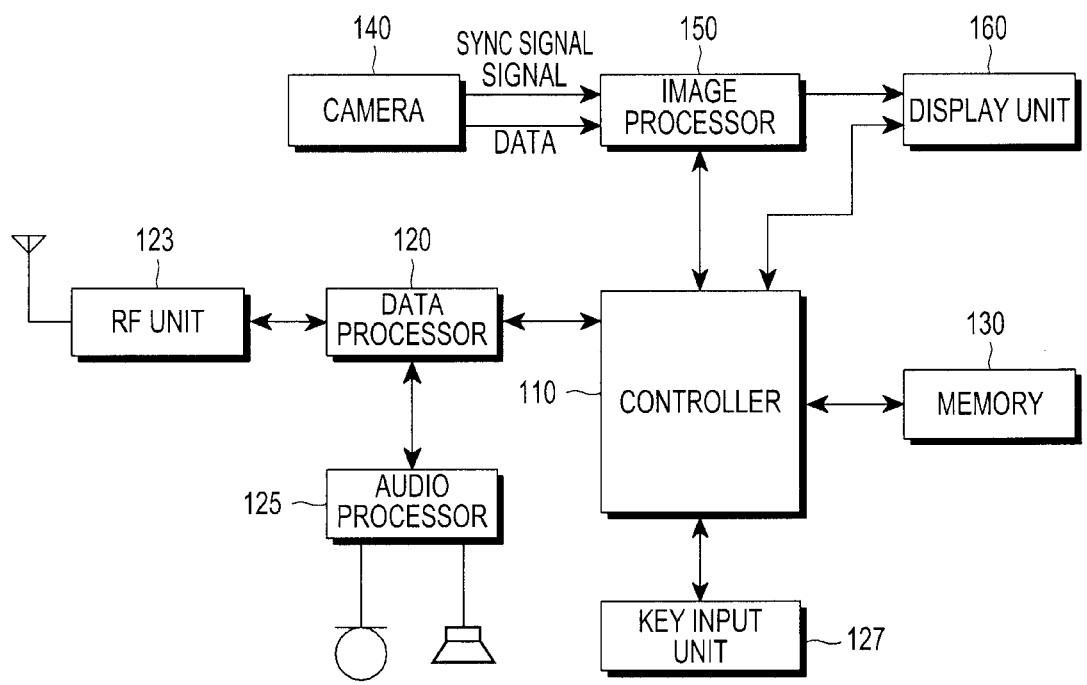
FIG. 1 is a block diagram of a wireless terminal according to an embodiment of the present invention.

Hereinafter, an exemplary embodiment of the present invention will be described in detail with reference to the accompanying drawings. It should be noted that identical reference numerals refer to identical components throughout the drawings.

FIG. 1 is a block diagram of a wireless terminal according to an embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. The data processor 120 may include a modem and a codec. Herein, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 includes keys for inputting numeric and character information and function keys for setting various functions.

A memory 130 includes program and data memories. The program memory stores programs for controlling a general operation of the wireless terminal and a program for individually managing data of a plurality of applications according to a type of a password for unlocking the wireless terminal according to an embodiment of the present invention. The data memory also temporarily stores data generated during execution of the programs.

According to an embodiment of the present invention, the memory 130 stores a plurality of passwords which are preset by a user, such that data corresponding each of a plurality of applications stored in the wireless terminal can be classified and managed using these passwords. That is, the passwords are used to unlock the wireless terminal, such as unlocking patterns or unlocking numbers. The plurality of passwords includes at least one password for classifying and managing data corresponding to each of the plurality of applications, and/or at least one password for collectively managing data of each of the plurality of applications. That is, the invention provides classifying and managing data of each of the plurality of applications by a particular password, or collectively managing (i.e., not dividing) data of each of the plurality of applications by a particular password. Here, the plurality of applications includes all applications executed in the wireless terminal, such as a phone directory application, a message application, an album application, recent records, etc., and the data may include prestored data or currently generated data for a subsequent retrieval, as explained later with reference to FIGS. 3 and 4.

The controller 110 controls the overall operation of the wireless terminal.

According to an embodiment of the present invention, the controller 110 classifies and manages data of each of the plurality of applications stored in the wireless terminal according to a type of a password.

According to an embodiment of the present invention, when a password input during a locking state of the wireless terminal is included in the plurality of preset passwords, the controller 110 classifies and manages data of each of the plurality of applications according to a type of the input password. The preset passwords may include predetermined patterns and/or predetermined numbers for unlocking the wireless terminal.

According to an embodiment of the present invention, when a particular password input during a locking state of the wireless terminal is included in the plurality of preset passwords, the controller 110 unlocks the password and switches the wireless terminal to a mode corresponding to the input particular password (or particular-password mode). When a data view menu for an application among the plurality of applications is selected in the particular-password mode, the controller 110 displays only a certain data, stored in the particular-password mode. To this end, the controller 110 classifies data in which key values of the particular-password mode are stored, out of all data of the applications, as the data stored in the particular-password mode and displays the corresponding classified data. That is, when a particular-password is input, any data including the key values of the particular-password is retrieved for display.

Further, when data executed in the selected application is generating during the particular-password mode, the controller 110 classifies the executed data as data of the particular-password mode and stores the executed or generated data as the data of the particular-password mode by assigning key values corresponding to the particular-password mode to the newly executed or generated data. That is, the controller 110 stores the key values of the particular-password mode in the data executed in the selected application, thereby classifying the data for a subsequent retrieval as the data of the particular-password mode.

A camera unit 140 captures an image, and may include a camera sensor for converting an optical signal of the captured image into an electrical signal, and a signal processor for converting an analog image signal of the image captured by the camera sensor into digital data. Herein, it is assumed that the camera sensor is a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

According to an embodiment of the present invention, when the wireless terminal is unlocked by a particular one of the plurality of passwords, the display unit 160 displays only data stored in a particular-password mode, out of data of a corresponding application.

Hereinafter, a detailed description will be made of an operation of managing an application according to a type of a password in the wireless terminal with reference to FIGS. 2 through 4D.

Figure 2:
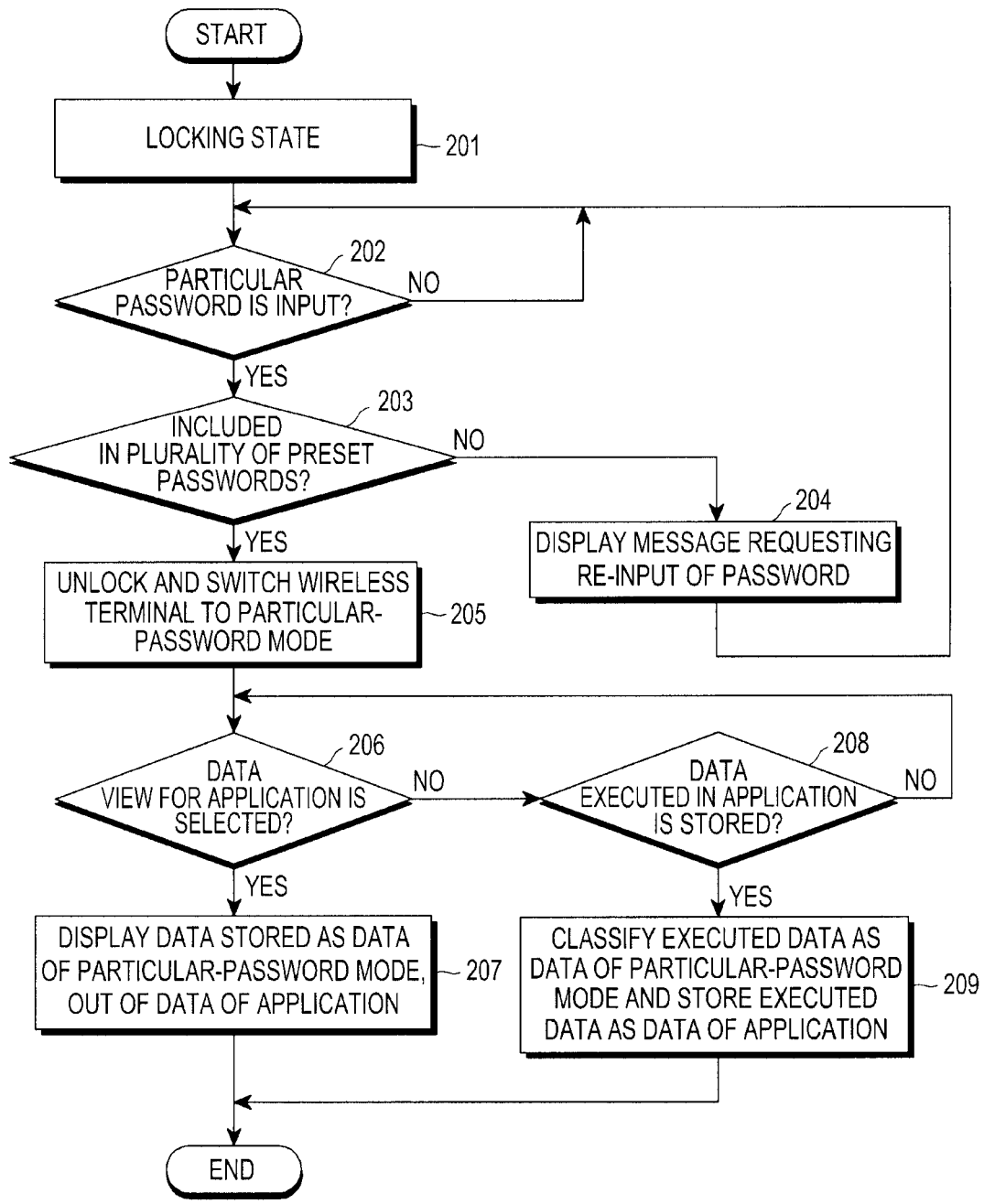
FIG. 2 is a flowchart illustrating a process of managing an application in a wireless terminal according to an embodiment of the present invention.

FIG. 2 is a flowchart illustrating a process of managing an application in a wireless terminal according to an embodiment of the present invention, and FIGS. 3A through 4D are diagrams for describing an operation of managing an application in a wireless terminal according to an embodiment of the present invention.

Herein, the teachings of the present invention will be described in detail with reference to FIGS. 2 through 4D, together with FIG. 1.

Referring to FIG. 2, upon input of a particular password for unlocking the wireless terminal in step 201 from a locking state, the controller 110 senses the input in step 202 and determines whether the input particular password is included in a plurality of preset passwords in step 203.

If determining that the input particular password is not included in the plurality of preset passwords in step 203, the controller 110 displays a message requesting re-input of a password in step 204.

If determining that the input particular password is included in the plurality of preset passwords in step 203, the controller 110 unlocks the wireless terminal and switches the wireless terminal to a particular-password mode corresponding to the input particular password in step 205.

In the particular password mode, if a data view menu for a corresponding application is selected in step 206, the controller 110 extracts data which stores key values of the particular-password mode from data of the corresponding application and displays only the extracted data as the data of the corresponding application on the display unit 160 in step 207.

In the particular-password mode, if a data view is not selected in step 206 and if data executed in a corresponding application is stored in step 208, the controller 110 stores key values of the particular-password mode in the executed data to classify the executed data as the data of the particular-password mode and store the executed data as the data of the corresponding application in step 209.

The process illustrated in FIG. 2 will now be described in more detail with reference to FIGS. 3A through 4D in which a pattern is assumed to be used as a password for unlocking the wireless terminal.

Figure 3A:
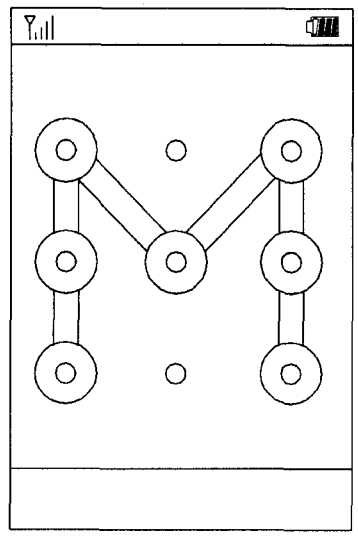
FIG. 3A, FIG. 3B, FIG. 3C, FIG. 3D, FIG. 4A, FIG. 4B, FIG. 4C and FIG. 4D are diagrams for describing an operation of managing an application in a wireless terminal according to an embodiment of the present invention.
Figure 3B:
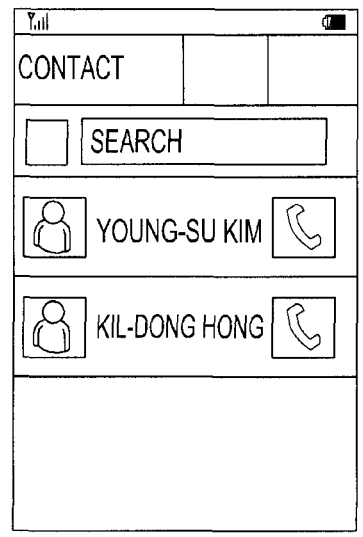

Referring to FIG. 3A, upon input of an "M" shaped pattern, out of a plurality of preset unlocking patterns, the wireless terminal is unlocked and switched to an "M" shaped pattern mode. If an application, such as a phone directory for example, is selected during the "M" shaped pattern mode, only phone number data storing key values of the "M" shaped pattern, out of all phone number data stored in the phone directory, is displayed as illustrated in FIG. 3B. Note that the key values corresponding to the "M" shaped pattern is pre-stored. When new phone number data is stored in the phone directory during the "M" shaped pattern mode, the key values indicating the "M" shaped pattern mode are newly stored, such that the stored new phone number data is classified as data representing the "M" shaped pattern mode for a later retrieval.

Note that the key values corresponding to data are prestored in each of the plurality of passwords. Accordingly, as shown in step 207, the data stored as the corresponding key value is extracted and displayed, when the application data corresponding to the particular-password mode is selected. As shown in step 209, the key values assigned in the particular-password mode are stored, when the data executed in the particular-password mode is stored. And, as shown in step 207, the data stored as the corresponding key value is extracted and displayed, when the application data corresponding to the particular-password mode is selected.

Figure 3C:
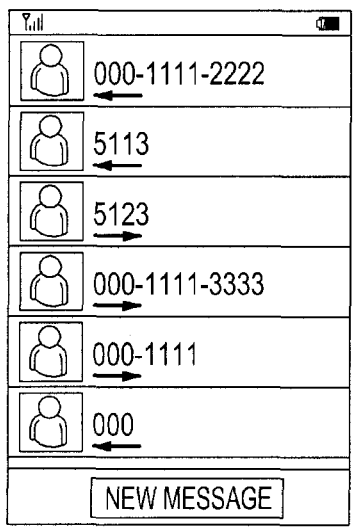

If a message application is selected during the "M" shaped pattern mode, only message data storing the key values of the "M" shaped pattern mode, out of outgoing/incoming messages stored in the message application, is displayed as illustrated in FIG. 3C. Note that the key values corresponding to the "M" shaped pattern is prestored. Also, if reception or transmission of new message data is performed in the "M" shaped pattern mode, the key values of the "M" shaped pattern mode are newly stored, such that the new message data is classified as data representing the "M" shaped pattern mode for a later retrieval.

Figure 3D:
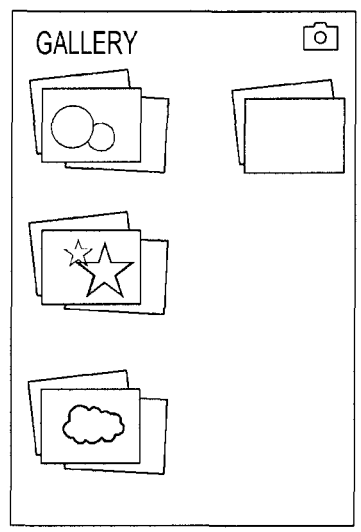

If an album view application is selected in the "M" shaped pattern mode, only image data storing the key values of the "M" shaped pattern mode, out of image data stored in the album view application, is displayed as illustrated in FIG. 3D. Note that the key values corresponding to the "M" shaped pattern is prestored. Further, if storing of a new image due to reception or capturing of the new image is selected in the "M" shaped pattern mode, the key values of the "M" shaped pattern mode are newly stored, such that the new image data is classified as data representing the "M" shaped pattern mode.

Figure 4A:
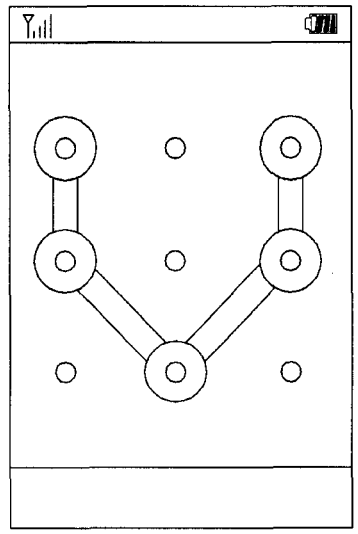
Figure 4B:

Referring to FIG. 4A, upon input of a "V" shaped pattern out of the plurality of preset unlocking patterns, the wireless terminal is unlocked and switched to a "V" shaped pattern mode. If an application, a phone directory for example, is selected during the "V" shaped pattern mode, only phone number data storing key values of the "V" shaped pattern, out of all the phone number data stored in the phone directory, is displayed as illustrated in FIG. 4B. Note that the key values corresponding to the "V" shaped pattern is prestored. Similarly, when new phone number data is stored in the phone directory in the "V" shaped pattern mode, the key values of the "V" shaped pattern mode are newly stored, such that the stored new phone number data is classified as data of the "V" shaped pattern mode for a later retrieval.

Figure 4C:
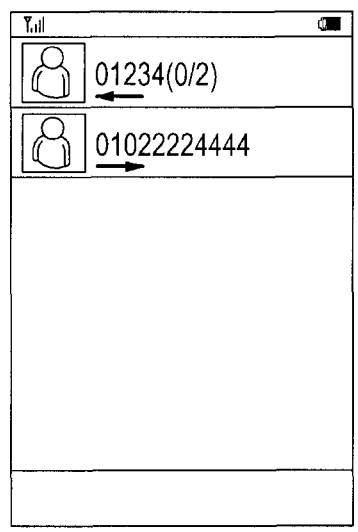

If a message application is selected in the "V" shaped pattern mode, only message data storing the key values of the "V" shaped pattern mode, out of outgoing/incoming messages stored in the message application, is displayed as illustrated in FIG. 4C. Note that the key values corresponding to the "V" shaped pattern is prestored. If reception or transmission of new message data is performed in the "V" shaped pattern mode, the key values of the "V" shaped pattern mode are newly stored i, such that the new message data is classified as data of the "V" shaped pattern mode.

Figure 4D:
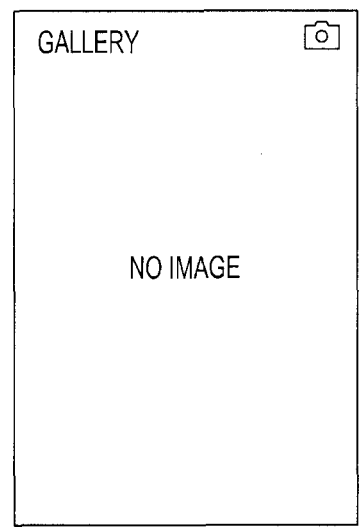

Upon selection of an album view application in the "V" shaped pattern mode, if there is no image data storing the key values of the "V" shaped pattern mode, out of image data stored in the album view application, absence of image data is displayed as illustrated in FIG. 4D. If storing of a new image due to reception or capturing of the new image is selected in the "V" shaped pattern mode, the key values of the "V" shaped pattern mode are stored in the new image data, such that the new image data is classified as data of the "V" shaped pattern mode.

As can be appreciated from the foregoing description, by providing an apparatus and method for managing data according to a type of a password in a wireless terminal, even when the wireless terminal is unlocked by a password input by a third party, only data of an application corresponding to a type of the input password is displayed, thereby keeping private information protection.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While a detailed embodiment such as a wireless terminal has been described in the present invention, various changes may be made without departing from the scope of the present invention. Accordingly, the scope of the present invention should be defined by the claims and equivalents thereof, rather than the described embodiment.

What is claimed is:

1. A non-transitory computer-readable storage medium storing instructions which when executed cause a wireless terminal to perform a method comprising:
   storing a plurality of unlocking patterns;
   receiving a first inputted unlocking pattern of the unlocking patterns and in response thereto, operating the wireless terminal in a first unlocking mode;
   when a first application is selected after entering the first unlocking mode, executing the first application and displaying first data associated with the first unlocking mode;
   receiving a second inputted unlocking pattern of the unlocking patterns and in response thereto, operating the wireless terminal in a second unlocking mode; and
   after entering the second unlocking mode, collectively managing data of an application stored in the wireless terminal.

2. The non-transitory computer-readable storage medium of claim 1, wherein the first unlocking pattern and the second unlocking pattern are each a pattern of continuous touch movement detected on a touch screen.

3. The non-transitory computer-readable storage medium of claim 2, wherein collectively managing data comprises enabling unrestricted access to stored data of the wireless terminal in the second unlocking mode.

4. The non-transitory computer-readable storage medium of claim 2, wherein, if the first application is selected after entering the second unlocking mode, data of the first application can be collectively managed by displaying second data in association with the second unlocking mode and the first data in association with the first unlocking mode.

5. The non-transitory computer-readable storage medium of claim 4, further comprising:
during operation in the first unlocking mode, storing the first data in association with the first unlocking mode; and
during operation in the second unlocking mode, storing the second data in association with the second unlocking mode.

6. The non-transitory computer-readable storage medium of claim 5, wherein collectively managing data comprises enabling access to both the first data in association with the first unlocking mode and the second data in association with the second unlocking mode.

7. The non-transitory computer-readable storage medium of claim 5, wherein the first application is a message application, an album view application or a phone directory application, and wherein the first data and second data are each message data, image data or phone number data.

8. A non-transitory computer-readable storage medium storing instructions which when executed cause a wireless terminal to perform a method comprising:
storing a plurality of unlocking patterns;
in a locked state of the wireless terminal, displaying a lock screen image having an unlocking pattern region on a touch screen to receive a pattern of touch movement;
receiving, via the unlocking pattern region, a first inputted unlocking pattern of the unlocking patterns, and operating the wireless terminal in a first unlocking mode in response to the first inputted unlocking pattern, the first unlocking mode being identified by the first inputted unlocking pattern;
when a first application is selected after entering the first unlocking mode, executing the first application and displaying first data associated with the first unlocking mode; and
receiving, via the unlocking pattern region displayed as part of the lock screen image at another time, a second inputted unlocking pattern of the unlocking patterns, and operating the wireless terminal in a second unlocking mode in response to the second inputted unlocking pattern, the second unlocking mode being identified by the second inputted unlocking pattern.

9. The non-transitory computer-readable storage medium of claim 8, wherein the wireless terminal is operated in the first unlocking mode without receiving a user identification input associated with the first inputted unlocking pattern, and wherein the wireless terminal is operated in the second unlocking mode without receiving a user identification input associated with the second inputted unlocking pattern.

10. The non-transitory computer-readable storage medium of claim 8, wherein the unlocking pattern region is defined by a text-free image.

11. The non-transitory computer-readable storage medium of claim 8, wherein the unlocking pattern region includes a dot matrix for guiding a touch pattern input.

12. The non-transitory computer-readable storage medium of claim 8, further comprising, after entering the second unlocking mode, collectively managing data of an application stored in the wireless terminal.

13. The non-transitory computer-readable storage medium of claim 12, wherein:
collectively managing data is provided in the second unlocking mode by enabling an unrestricted access of data associated with the application stored in the wireless terminal,
whereas in the first unlocking mode, a restricted access of data associated with the application stored in the wireless terminal is enabled.

14. The non-transitory computer-readable storage medium of claim 8, further comprising, when the first application is selected after entering the second unlocking mode, executing the first application and displaying second data in association with the second unlocking mode and the first data.

15. The non-transitory computer-readable storage medium of claim 14, further comprising:
during operation in the first unlocking mode, storing the first data in association with the first unlocking mode; and
during operation in the second unlocking mode, storing the second data in association with the second unlocking mode.

16. A wireless terminal comprising:
a touch screen;
a memory for storing a plurality of unlocking patterns and a plurality of executable applications; and
a controller configured to:
receive a first inputted unlocking pattern of the unlocking patterns and in response thereto, operate the wireless terminal in a first unlocking mode;
when a first application is selected after entering the first unlocking mode, execute the first application and control the touch screen to display first data associated with the first unlocking mode;
receive a second inputted unlocking pattern of the unlocking patterns and in response thereto, operate the wireless terminal in a second unlocking mode; and
after entering the second unlocking mode, collectively manage data of an application stored in the wireless terminal.

17. The wireless terminal of claim 16, wherein the first unlocking pattern and the second unlocking pattern are each a pattern of continuous touch movement detected on the touch screen.

18. The wireless terminal of claim 17, wherein the controller is configured to perform the collective management of data of the application by enabling unrestricted access to stored data of the wireless terminal in the second unlocking mode.

19. A wireless terminal comprising:
a touch screen;
a memory for storing a plurality of unlocking patterns and a plurality of executable applications; and
a controller configured to:
in a locked state of the wireless terminal, control the touch screen to display a lock screen image having an unlocking pattern region to receive a pattern of touch movement;
receive, via the unlocking pattern region, a first inputted unlocking pattern of the unlocking patterns and in response thereto, operate the wireless terminal in a first unlocking mode, the first unlocking mode being identified by the first inputted unlocking pattern;
when a first application is selected after entering the first unlocking mode, execute the first application and control the touch screen to display first data associated with the first unlocking mode; and
receive, via the unlocking pattern region displayed as part of the lock screen image at another time, a second inputted unlocking pattern of the unlocking patterns, and operate the wireless terminal in a second unlocking mode in response to the second inputted unlocking pattern, the second unlocking mode being identified by the second inputted unlocking pattern.

20. The wireless terminal of claim 19, wherein the wireless terminal is operated in the first unlocking mode without receiving a user identification input associated with the first inputted unlocking pattern, and wherein the wireless terminal is operated in the second unlocking mode without receiving a user identification input associated with the second inputted unlocking pattern.

21. The wireless terminal of claim 19, wherein the unlocking pattern region is defined by a text-free image.

22. The wireless terminal of claim 19, wherein the unlocking pattern region includes a dot matrix for guiding a touch pattern input.

23. The wireless terminal of claim 19, wherein the first unlocking pattern and the second unlocking pattern are each a pattern of continuous touch movement detected on the touch screen.

24. The wireless terminal of claim 19, wherein the controller is further configured to:
after entering the second unlocking mode, collectively manage data of the application stored in the wireless terminal by enabling an unrestricted access of data associated with the application stored in the wireless terminal,
wherein in the first unlocking mode, a restricted access of data associated with the application stored in the wireless terminal is enabled.

25. The wireless terminal of claim 19, wherein the controller is further configured to:
when the first application is selected after entering the second unlocking mode, execute the first application and control the touch screen to display second data in association with the second unlocking mode and the first data.

26. The wireless terminal of claim 25, wherein the controller is further configured to:
during operation in the first unlocking mode, store the first data in association with the first unlocking mode; and
during operation in the second unlocking mode, store the second data in association with the second unlocking mode.

27. The wireless terminal of claim 26, the controller is further configured to:
enable access to both the first data in association with the first unlocking mode and the second data in association with the second unlocking mode in the second unlocking mode.

28. The wireless terminal of claim 26, wherein the first application is a message application, wherein the first data and second data are each message data.

29. The wireless terminal of claim 26, wherein the first application is an album view application, wherein the first data and second data are each image data.

30. The wireless terminal of claim 26, wherein the first application is a phone directory application, wherein the first data and second data are each phone number data.

* * * * *